United States Patent
Nakatani et al.

(10) Patent No.: US 12,468,482 B2
(45) Date of Patent: Nov. 11, 2025

(54) INFORMATION PROCESSING DEVICE

(71) Applicant: TOYOTA JIDOSHA KABUSHIKI KAISHA, Toyota (JP)

(72) Inventors: Sho Nakatani, Tokyo (JP); Katsunori Takahashi, Tokyo (JP); Ryo Neyama, Tokyo (JP); Nayuta Yanagisawa, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/812,171

(22) Filed: Aug. 22, 2024

(65) Prior Publication Data
US 2024/0411480 A1     Dec. 12, 2024

(30) Foreign Application Priority Data
Dec. 1, 2023   (JP) ................. 2023-204033

(51) Int. Cl.
*G06F 3/06* (2006.01)
(52) U.S. Cl.
CPC .......... *G06F 3/0655* (2013.01); *G06F 3/0604* (2013.01); *G06F 3/0673* (2013.01)

(58) Field of Classification Search
None
See application file for complete search history.

(56) References Cited

U.S. PATENT DOCUMENTS

2012/0191724 A1*  7/2012  Tucek ................. G06F 16/113
                                                                 707/747

FOREIGN PATENT DOCUMENTS

JP    2017-107353 A    6/2017

* cited by examiner

*Primary Examiner* — Brian R Peugh
(74) *Attorney, Agent, or Firm* — SoraIP, Inc.

(57) ABSTRACT

The information processing device places the input first data in at least one of the plurality of storage devices. The information processing device includes a control unit that executes acquisition of a constraint condition including a first condition related to time for determining a storage device in which the first data is to be placed, and, when the generation time of the first data satisfies the first condition, determination of a first storage device that is a storage device to which the first data is to be placed according to the constraint condition.

5 Claims, 5 Drawing Sheets

INFORMATION PROCESSING DEVICE

CROSS-REFERENCE TO RELATED APPLICATION

This application claims priority to Japanese Patent Application No. 2023-204033 filed on Dec. 1, 2023, incorporated herein by reference in its entirety.

BACKGROUND

1. Technical Field

The present disclosure relates to devices that manage data placement.

2. Description of Related Art

A technique is known in which data is divided and placed in a plurality of servers in a distributed manner. In this regard, for example, Japanese Unexamined Patent Application Publication No. 2017-107353 (JP 2017-107353 A) discloses a load balancer etc. that distributes own-base return signals from processing servers of another base to processing servers of an own base within a range that does not exceed individual central processing unit (CPU) limit values, based on the maximum values of CPU usage rates and the load variation rates of the processing servers of the own base.

SUMMARY

An object of the present disclosure is to perform distributed data placement using a condition regarding time.

An aspect of an embodiment of the present disclosure is an information processing device that places received first data in at least one of a plurality of storage devices. The information processing device includes a control unit. The control unit is configured to
  acquire a constraint condition including a first condition regarding a time, the constraint condition being a condition for determining the storage device in which the first data is to be placed, and
  when a generation time of the first data meets the first condition, determine a first storage device according to the constraint condition, the first storage device being the storage device in which the first data is to be placed.

Other aspects include a method that is performed by the above device, a program that causes a computer to perform the method, and a computer-readable storage medium storing the program in a non-transitory manner.

According to the present disclosure, it is possible to perform distributed data placement using a condition regarding time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Overview

Figure 1:
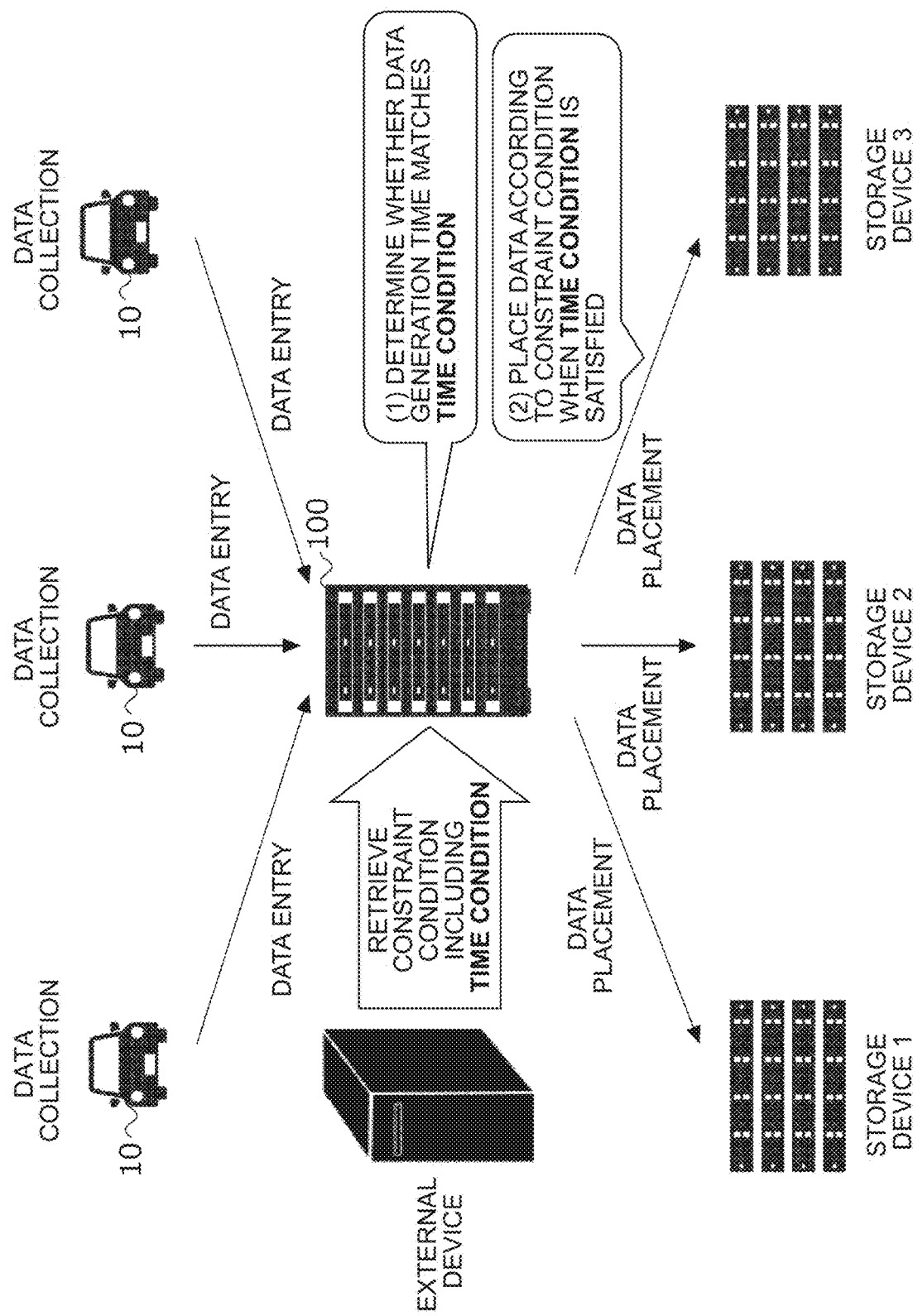
FIG. 1 is a diagram illustrating an outline of processing executed by a server device according to a first embodiment.

It is assumed that various types of data are collected from a vehicle equipped with a mobile communication terminal, placed in a cloud server, and used. In such a system, a device that manages the placement of data may divide or duplicate data acquired from a vehicle and dispose the data in a plurality of storage devices in a distributed manner. Such a technique is referred to as sharding. The device managing the sharding may determine a storage device in which the data is to be placed, taking into account predetermined constraint condition. Examples of the predetermined constraint condition include hardware resources of each storage device, a geographical position of each storage device, and the like.

However, in the related art related to sharding, although data can be placed in a storage device in consideration of a predetermined constraint condition, a condition related to time cannot be used as a constraint condition. That is, the location of the data is determined based on the time at which the data is generated, and the replacement of the data cannot be executed in accordance with the elapse of the time. In order to solve this problem, it is desirable that the device be able to place or delete the data according to a certain constraint condition in accordance with the time at which the predetermined data is generated.

An information processing device according to an aspect of the present disclosure is an information processing device that places input first data in at least one of a plurality of storage devices. The information processing device includes a control unit configured to execute acquisition of a constraint condition including a first condition related to time for determining a storage device in which the first data is placed. When the generation time of the first data satisfies the first condition, the control unit determines a first storage device that is a storage device to which the first data is to be placed according to the constraint condition.

The first data is data placed in a plurality of storage devices. Typically, the first data is data collected by a mobile communication terminal, a device installed on a road, or the like, and is data input to the information processing device according to the present disclosure from a mobile communication terminal, a device installed on a road, or the like.

The first condition is a condition related to the generation time of the first data. The first condition indicates, for example, a condition such as "whether the generation time of the first data is a time before the predetermined time" and "whether the generation time of the first data is a time after the predetermined time". Note that the generation time of the first data does not need to be composed only of the time information, and may include information on the date when the first data was generated.

The first storage device is a storage device in which first data is placed among a plurality of storage devices.

When the generation time of the first data satisfies a predetermined condition, the control unit determines a first storage device for placing the first data according to the acquired constraint condition.

Accordingly, the information processing device according to the present disclosure can place the data in the storage device selected according to the constraint condition according to the generation time of the data. That is, the information processing device according to the present disclosure is capable of distributing and placing data using conditions related to time.

In addition, when the constraint condition includes a variable of time, the control unit may calculate a first constraint condition that is the constraint condition at a first time that is a specific time, and predict data placement based on the first constraint condition.

By including a variable of time (for example, a variable to which the current time is assigned) in the constraint condition, it becomes possible to, for example, "move data to another storage device when a certain time or more has elapsed". This allows, for example, "relatively new data to be located in a geographically close storage device and stale data to be moved to a geographically distant storage device."

At this time, by substituting a specific time (for example, a future time) for the variable, it is possible to predict how the data placement will change in the future.

According to such a configuration, the information processing device according to the present disclosure can predict a variation in data placement between a plurality of storage devices that may occur in the future.

In addition, when the constraint condition includes a variable of time, the control unit may calculate a second constraint condition that is the constraint condition at a second time that is a specific time in the future, and predict a future placement that is an placement of the first data when the second constraint condition is followed. When the amount of change in the data placement is larger than a predetermined amount at a time point when the second time arrives in a case where the placement of the data placement is changed from the placement of the current first data to the future placement, the control unit may move the first data already placed in any one of the plurality of storage devices to another storage device of the plurality of storage devices in advance within the range of the current constraint condition at the present time.

As a result, the information processing device according to the present disclosure can change the data placement in advance in preparation for the change of the data placement that occurs in accordance with the lapse of time. For example, when a large amount of data movement occurs at a certain point in time, processing resources and network resources may be occupied, and the performance of the system may be degraded. However, moving the data in advance can prevent or reduce such degradation in performance.

When the constraint condition includes a condition regarding remaining capacities of the storage devices, the control unit may determine, based on the remaining capacities of the storage devices, in which of the storage devices second data is to be placed, the second data being a duplicate of the first data.

Thus, the information processing device according to the present disclosure can reliably store duplicated data.

In addition, when determining in which of the plurality of storage devices the second data that is a duplicate of the first data is to be placed, the control unit may specify a predetermined range of the number of the storage devices in which the second data is to be placed, the predetermined range being from a first number of the storage devices to a second number of the storage devices. The control unit may determine to place the second data in the storage device among the plurality of storage devices in which the remaining capacity is equal to or larger than a predetermined amount so as to satisfy the number of designated predetermined ranges.

Thus, the information processing device according to the present disclosure can flexibly select a storage device that stores duplicated data.

Hereinafter, embodiments of the present disclosure will be described with reference to the drawings. A hardware configuration, a module configuration, a functional configuration, etc., described in each embodiment are not intended to limit the technical scope of the disclosure to them only unless otherwise stated.

First Embodiment

Overview of the Processing of the Server Device

An outline of processing performed by the server device according to the embodiment will be described with reference to FIG. 1. FIG. 1 is a diagram illustrating an outline of processing executed by the server device 100 according to the embodiment. Here, the server device 100 is an example of an information processing device according to the present disclosure. The server device 100 receives various types of data from a mobile communication terminal, a device installed on a road, or the like. In addition, the server device 100 communicates with a plurality of storage devices and places the received various data to the plurality of storage devices in a distributed manner. The server device 100 can also be said to be a device that manages sharding of data.

First, the plurality of vehicles 10 collect various types of data. Then, the plurality of vehicles 10 communicate with the server device 100 and transmit the collected various data to the server device 100. The various data may be, for example, data indicating a dangerous place on the road. The server device 100 may collect measurement data from the vehicle 10 or various devices installed on the road in order to detect a dangerous traveling location such as freezing or flooding on the road, and may place and manage the measurement data in the storage device.

Next, the server device 100 acquires, from the external device, a constraint condition that is referred to when the transmitted data is distributed to a plurality of storage devices. The constraint condition is a set of conditions used for distributing data to a plurality of storage devices. The constraint condition may include, for example, a set of "constraint" and "goal". The constraint is, for example, a condition that must be adhered to, such as a storage remaining capacity of the storage device. The goal is, for example, a condition desired by the user, such as "placing at least two replicas of data and at most five replicas of data". The server device 100 determines the location of the data to satisfy the constraints and to achieve the goal as much as possible. In the present embodiment, the constraint condition includes a condition related to time. Here, the condition relating to the time may be a condition for specifying the generation time of the input data. Further, the constraint condition may include a variable to which the time is substituted, or a variable to which a result of calculating the time by a predetermined function is substituted. That is, the content of the constraint condition may change according to the current time at which the process is executed.

The server device 100 determines whether or not the generation time of the input data matches the time condition included in the acquired constraint condition. When the generation time of the input data matches the acquired time condition, the server device 100 places the input data in a distributed manner in a plurality of storage devices according to the constraint condition. That is, the server device 100 determines in which storage device the data satisfying the time condition is to be placed according to the constraint condition.

For example, a case where the time condition is a condition that "the generation time of the input data is Jan. 1, 2023 or later" is considered. The server device 100 does not execute the placement of the data generated on Mar. 4, 2022 in the storage device because the data does not satisfy the time condition. For example, the server device 100 may delete the data without storing the data in the storage device. On the other hand, since the data generated on Jul. 10, 2023 satisfies the time condition, the server device 100 places the data in any of the storage devices according to the constraint condition at the current time at which the processing is performed. At this time, the constraint condition may include a condition that "the remaining storage capacity of the storage device is equal to or larger than a predetermined amount".

As described above, in the present embodiment, the constraint condition includes the condition related to the time, and the server device 100 determines the storage device in which the data is placed by using the condition related to the time. With such a configuration, the server device 100 can distribute and place the data using the condition related to the time.

Configuration of Server Device

Figure 2:
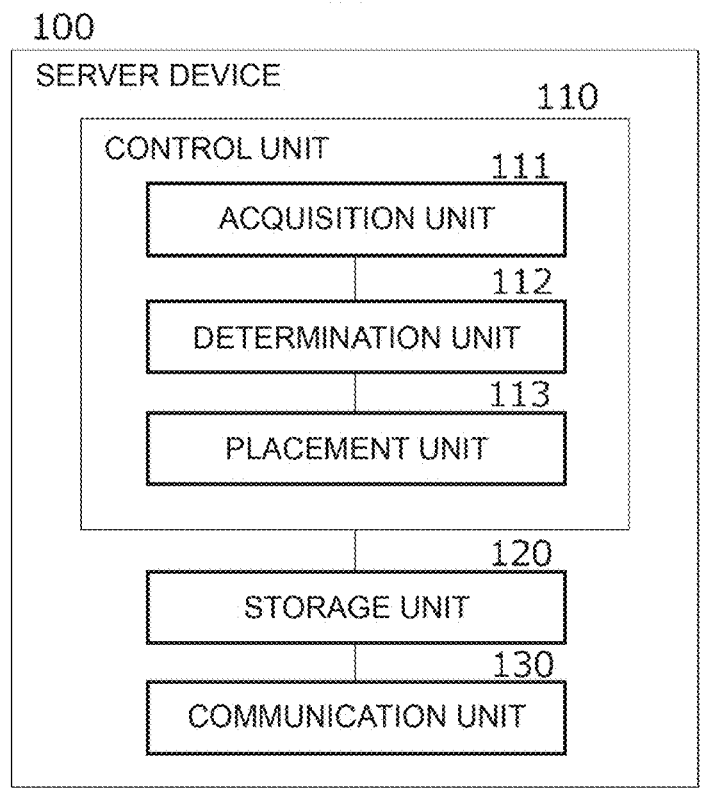
FIG. 2 is a diagram illustrating components of the server device according to the first embodiment.

FIG. 2 is a diagram for describing components included in the server device 100 according to the embodiment. In FIG. 2, the server device 100 may be a collection (cloud) of one or more computers.

The server device 100 according to the present embodiment includes a control unit 110, a storage unit 120, and a communication unit 130.

The control unit 110 is implemented by a processor such as a CPU (Central Processing Unit) or a GPU (Graphics Processing Unit) and a memory. The control unit 110 includes an acquisition unit 111, a determination unit 112, and a placement unit 113 as functional modules. These functional modules may be realized by executing a program by the control unit 110.

The acquisition unit 111 acquires data collected by the vehicle 10, a device installed on a road, or the like. The acquisition unit 111 communicates with the vehicle 10 or a device installed on a road or the like via the communication unit 130, and acquires the data.

Further, the acquisition unit 111 acquires, from an external device, a constraint condition including a first condition related to time. Here, the first condition regarding the time is a condition for specifying the generation time of the input data. The constraint condition is a constraint condition related to the placement of the input data in the storage device. The constraint condition may be created by, for example, an administrator of the data collection system.

The determination unit 112 determines whether or not the generation time of the input data satisfies the acquired first condition. For example, when the first condition is "the generation time of the data is earlier than the predetermined time", the determination unit 112 may determine whether the generation time of the input data is earlier than the time specified by the first condition. When the generation time of the input data is earlier than the predetermined time, it may be determined that the generation time of the input data satisfies the first condition.

When the determination unit 112 determines that the generation time of the input data satisfies the first condition, the placement unit 113 determines, according to the constraint condition, the first storage device that is the storage device to which the first data is to be placed. The placement unit 113 selects a storage device in which the first data is to be placed from among a plurality of storage devices in accordance with a constraint condition acquired by the acquisition unit 111 from an external device or the like.

The storage unit 120 is an auxiliary storage device such as a main storage device such as a RAM or a ROM, a EPROM, a hard disk drive, and a removable medium. The secondary storage device stores an operating system (OS), various programs, various tables, and the like, and by executing the programs stored therein, it is possible to realize the respective functions matching the predetermined objectives of the respective units of the control unit 110. However, some or all of the functions may be implemented by a hardware circuit such as an ASIC or an FPGA.

The storage unit 120 stores data or the like used or generated in processing performed by the control unit 110. Further, the storage unit 120 stores addresses and the like of a plurality of storage devices including the first server. Further, the storage unit 120 may temporarily store various types of data received from the vehicle 10 or the like.

The communication unit 130 includes a communication circuit that performs wireless communication. The communication unit 130 may be, for example, a communication circuit that performs wireless communication using 4G (4th Generation) or a communication circuit that performs wireless communication using 5G (5th Generation). The communication unit 130 may be a communication circuit that performs radio communication using LTE (Long Term Evolution) or a communication circuit that performs communication using LPWA (Low Power Wide Area). Further, the communication unit 130 may be a communication circuit that performs radio communication using Wi-Fi (registered trademark).

Operation of the Server Device

Figure 3:
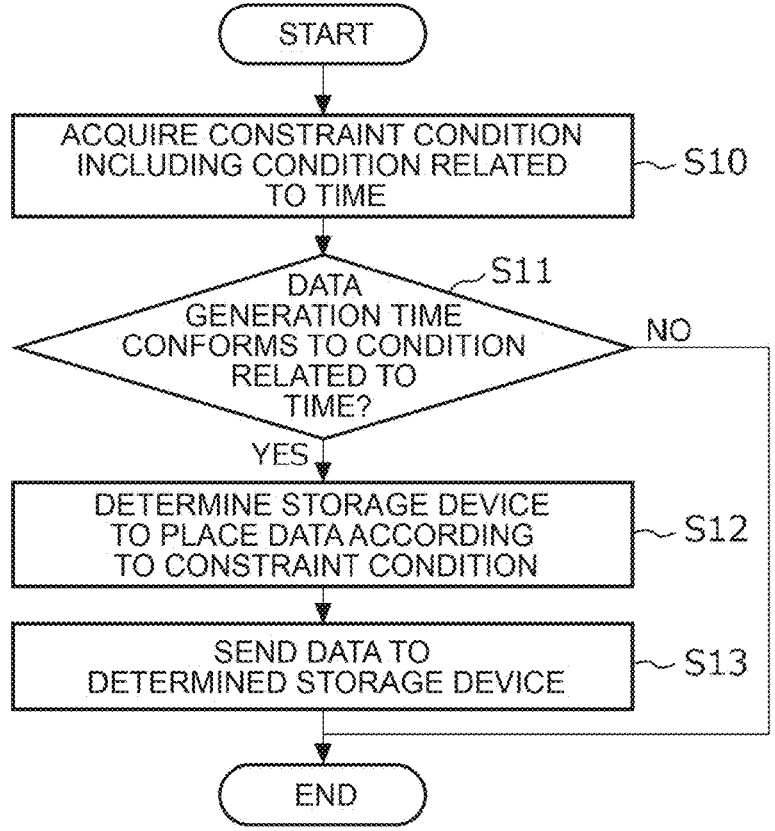
FIG. 3 is a flowchart of processing executed by a control unit of the server device according to the first embodiment.

Next, specific contents of the processing performed by the server device 100 will be described. FIG. 3 is a flowchart of processing executed by the control unit 110 of the server device 100 according to the embodiment.

Before the illustrated processing is started, it is assumed that the acquisition unit 111 of the server device 100 periodically communicates with the vehicle 10 equipped with the mobile communication terminal or a device installed on a road or the like, and acquires various data therefrom. Alternatively, when the vehicle 10 equipped with the mobile communication terminal or a device installed on a road or the like detects a specific event, the server device 100 may receive information indicating this from the vehicle 10 or the like and acquire various data from the vehicle 10 or the like. The data acquired in advance by the acquisition unit 111 is a specific example of "first data". The first data may be input to the server device 100 from the vehicle 10 or various devices, and may be acquired by the acquisition unit 111.

First, in S10, the acquisition unit 111 acquires a constraint condition including a condition related to time. Here, the condition related to the time is a condition (first condition) for specifying the generation time of the first data. For example, the first condition may be a condition that the generation time of the first data acquired by the acquisition unit 111 is later than a predetermined time. The constraint condition is a set of conditions used for determining a storage device (server device) in which the first data is placed. The content of the constraint condition may change according to the current time at which the process is performed.

Further, the constraint condition acquired by the acquisition unit 111 may include a variable (hereinafter, referred to as a time variable) related to time, and the content thereof may be changed according to the current time at which the processing described in FIG. 3 is executed. Note that the time variable may be a variable to which a time (a current time or the like) is substituted, or a variable to which a result of calculating a time by a predetermined function is substituted. For example, consider a case where there is a time variable T to which the present time is assigned, and a first condition that "the generation time of the first data is after (T−24 time)" is defined in the constraint condition. In this case, when the current time is 12:00 on Jan. 1, 2023, the first condition is "the generation time of the first data is after 12:00 on Dec. 31, 2022".

Subsequently, in S11, the determination unit 112 determines whether or not the generation time of the inputted data (first data) matches the condition (first condition) related to the time. For example, the determination unit 112 may determine whether the generation time of the first data is later than the predetermined time. In this step, when the determination unit 112 determines that the generation time of the input data (first data) satisfies the condition (first condition) related to the time, an affirmative determination is made.

If an affirmative determination is made in this step, the process proceeds to S12.

If a negative determination is made in this step, the process ends.

When the process transitions to S12, the placement unit 113 determines a storage device (an exemplary "first storage device") in which the first data is to be placed in accordance with the constraint condition acquired by the acquisition unit 111.

For example, consider a case where the constraint condition includes a condition that "data is placed in a predetermined number of storage devices from among storage devices having a remaining capacity of a predetermined amount or more". In this case, the placement unit 113 may select a predetermined number of storage devices from among a plurality of storage devices whose remaining capacity is equal to or larger than a predetermined amount, and determine the selected storage device as a storage device for placing the first data. Here, the predetermined number may be indicated in a range of the number from the first number to the second number. The placement unit 113 may select the number of storage devices that satisfy the range of "the first number or more and the second number or less" from the storage devices having the remaining capacity of a predetermined amount or more, and determine the storage device as the storage device for placing the first data.

Figure 4:
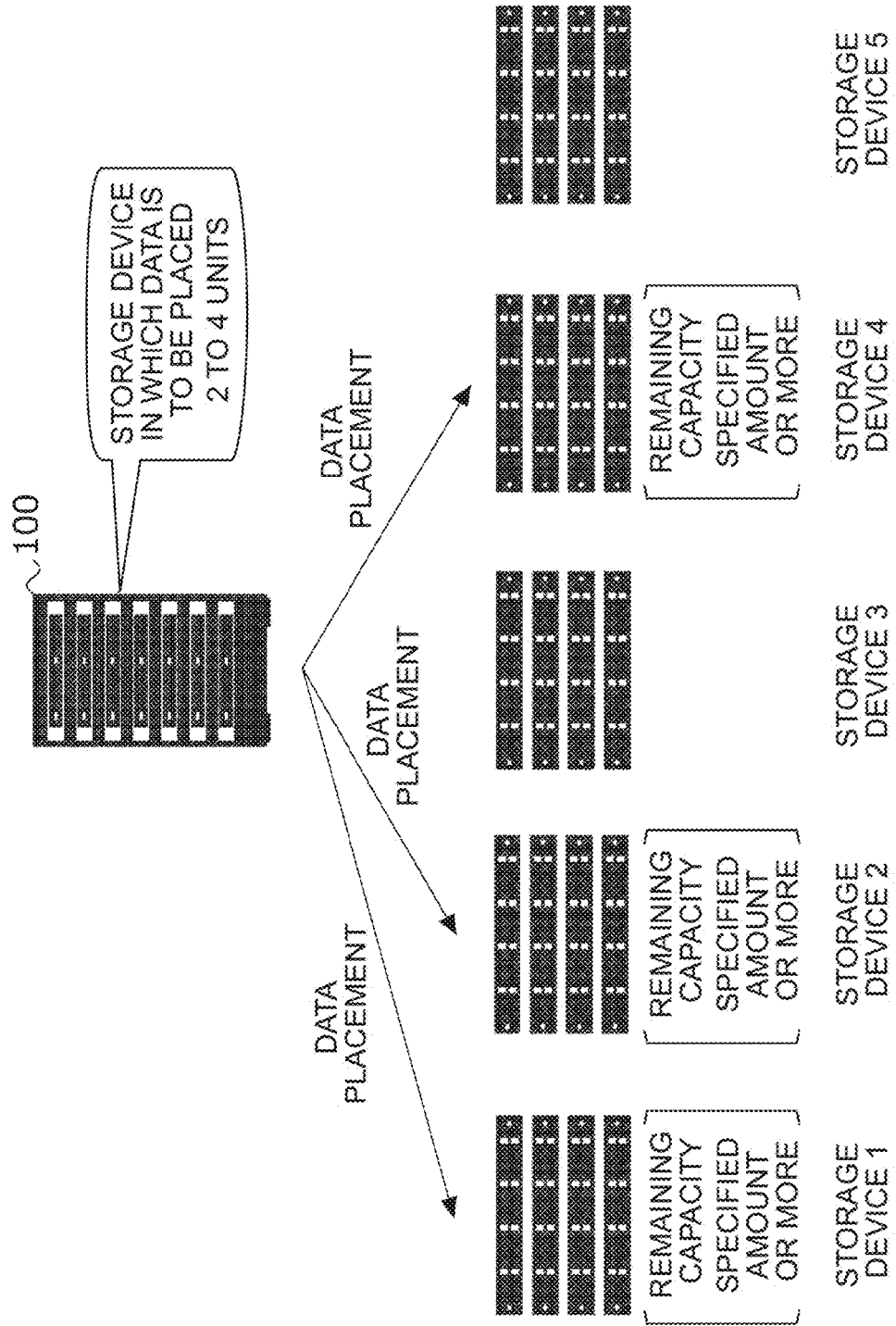
FIG. 4 is a diagram illustrating an outline of a process in which a server device according to the first embodiment places data in a storage device based on a constraint condition.

As illustrated in FIG. 4, for example, in a case where the constraint condition specifies that "the first data is placed in two to four storage devices in which the remaining capacity is equal to or greater than the predetermined amount", the placement unit 113 may determine to place the first data in three storage devices in which the remaining capacity is equal to or greater than the predetermined amount. The remaining capacity of the storage device may be a current remaining capacity value, a statistical value obtained from a plurality of past remaining capacity values (for example, a moving average of the remaining capacity values), or an expected value of a future remaining capacity value calculated by some algorithm.

Next, in S13, the placement unit 113 transmits the first data to the storage device determined in S12. When transmitting the first data to the plurality of storage devices, the placement unit 113 may divide the first data (for example, in units of rows and columns) and transmit the first data to the respective storage devices. The placement unit 113 may duplicate the first data and transmit it to the respective storage devices, or may be a combination thereof.

Accordingly, the server device 100 can place the first data in the storage device based on the constraint condition in accordance with the generation time of the data. Therefore, the server device 100 can distribute and place the data using the condition related to the time.

Data Placement Determination Examples

Next, in the first embodiment, a specific example in which the placement unit 113 determines a method of placing the first data in the storage device will be described.

For example, a case will be considered in which traffic information is collected from a vehicle 10 equipped with a mobile communication terminal, a device installed on a road, or the like, and recorded in a storage device placed for each region. In this example, it is assumed that the prefecture in which the first data is collected is the Tokyo Metropolitan Government, and one storage device is installed in each of the Tokyo Metropolitan Government, the Osaka Prefecture, and the Okinawa Prefecture. The acquisition period of the first data is assumed to be 0:0 on Dec. 1, 2022 to 0:0 on Sep. 15, 2023. Here, the duplicated data is referred to as a replica. In this example, a replica is replicated first data. Placing the data in the storage device after generating the replica can instruct the server device 100 via the constraint condition.

First, it is assumed that a condition that "three replicas of the first data generated in 2023 are placed in an arbitrary storage device" is specified as a constraint condition including a condition related to time. As a constraint condition including a condition related to time, it is assumed that a condition of "placing one replica of the first data generated before 2022 in the nearest storage device" is specified. In this case, three replicas of the first data generated in 2023 are placed in a storage device at any place, and one replica of the first data generated in 2022 is placed in a storage device in Tokyo. For example, as a result of the calculation of the placement unit 113 based on the constraint conditions, two replicas of the first data generated in 2023 and one replica of the first data generated in 2022 are placed in the storage device in Tokyo. As a result of the calculation of the placement unit 113 based on the constraint conditions, one replica of the first data generated in 2023 is placed in the storage device in Osaka.

Next, a case where a condition that "two replicas of first data collected in Tokyo and generated before 2022 are placed" is specified as a constraint condition including a condition related to time will be described. However, it is assumed that the constraint condition further includes a condition that "one of the replicas is placed in a storage device in Tokyo, and one of the storage devices other than Tokyo is placed in a storage device having a 100 GB remaining capacity or more".

In this case, one of the replicas of the first data generated before 2022 is placed in a storage device in Tokyo. The other one of the replicas of the first data generated before 2022 is placed in a storage device having a 100 GB remaining capacity or more among the storage devices in Osaka or Okinawa. For example, when the remaining capacity of the storage device in Okinawa is equal to or larger than 100 GB value, the other one of the replicas of the first data generated before 2022 is placed in the storage device in Okinawa as a result of the calculation by the placement unit 113 based on the constraint condition.

Next, a case where a condition that "one or more replicas of first data collected in Tokyo and generated before 2022 are placed less than three" is specified as a constraint condition including a condition related to time will be described. However, it is assumed that the constraint condition further includes a condition that "one replica is placed in a storage device in Tokyo, and at most two replicas are placed in a storage device having a 100 GB or more remaining capacities among storage devices other than Tokyo".

In this case, one of the replicas of the first data generated before 2022 is placed in a storage device in Tokyo. Up to two of the replicas of the first data generated before 2022 are placed in a storage device having a 100 GB remaining capacity or more among the storage devices in Osaka or Okinawa. For example, as a result of the calculation of the placement unit 113 based on the constraint condition, only one replica of the first data generated before 2022 is placed in the storage device in Okinawa satisfying the condition.

Finally, a case will be described where a condition of "placing a replica of first data collected in Tokyo and generated before 2022 in a range of 1 or more and less than 3" is designated as a constraint condition including a condition related to time. However, the constraint condition further includes a condition that "one replica is placed in a storage device in Tokyo, and at most two replicas are placed in a storage device having a 100 GB or more remaining capacities among storage devices other than Tokyo". Further, it is assumed that the constraint condition further includes a condition that "when the time zone in which the server device 100 performs the process of managing data is the daytime time zone, the number of replicas is always three is stored in any of the storage devices".

In this case, at 0:0 on Sep. 14, 2023, the server device 100 can reduce the number of replicas of the first data generated before 2022 to one. However, since the server device 100 needs to reserve three replicas after about 6 hours (daytime time zone), the server device 100 may reserve three replicas even at 0:0 on Sep. 14, 2023. For example, one replica of the first data generated before 2022 is placed on one storage device in Tokyo, Osaka, and Okinawa at 0:0 on Sep. 14, 2023.

As described above, in the first embodiment, the server device 100 acquires a constraint condition including a first condition that is a condition related to time. When the generation time of the first data satisfies the first condition, the server device 100 determines to place the first data in any one of the plurality of storage devices according to the constraint condition. In other words, the server device 100 can implement distributed placement of data using the conditions related to the time.

Second Embodiment

Configuration of Server Device

In the first embodiment, when the generation time of the first data satisfies the first condition, the server device 100 determines the first storage device in which the first data is to be placed according to the constraint condition, and places the first data in the first storage device. However, when a future time arrives, a constraint condition to be applied is changed, so that the placement of data among a plurality of storage devices may vary greatly at the time. For example, a large amount of data may be copied or moved due to a change in the location of the data at a certain time in the future, which may affect the performance of the network or the system.

In order to cope with this, the server device 100 preferably predicts the data placement at a future time in preparation for a significant change in the data placement between the plurality of storage devices at a future time, and prepares for the change in the data placement as much as possible within the scope of the current constraint. The second embodiment is an embodiment in which the server device 100 predicts the data placement at the future time and changes the current data placement in advance under the current constraint condition so that the amount of data transfer for changing the data placement at the future time is reduced.

Figure 5:
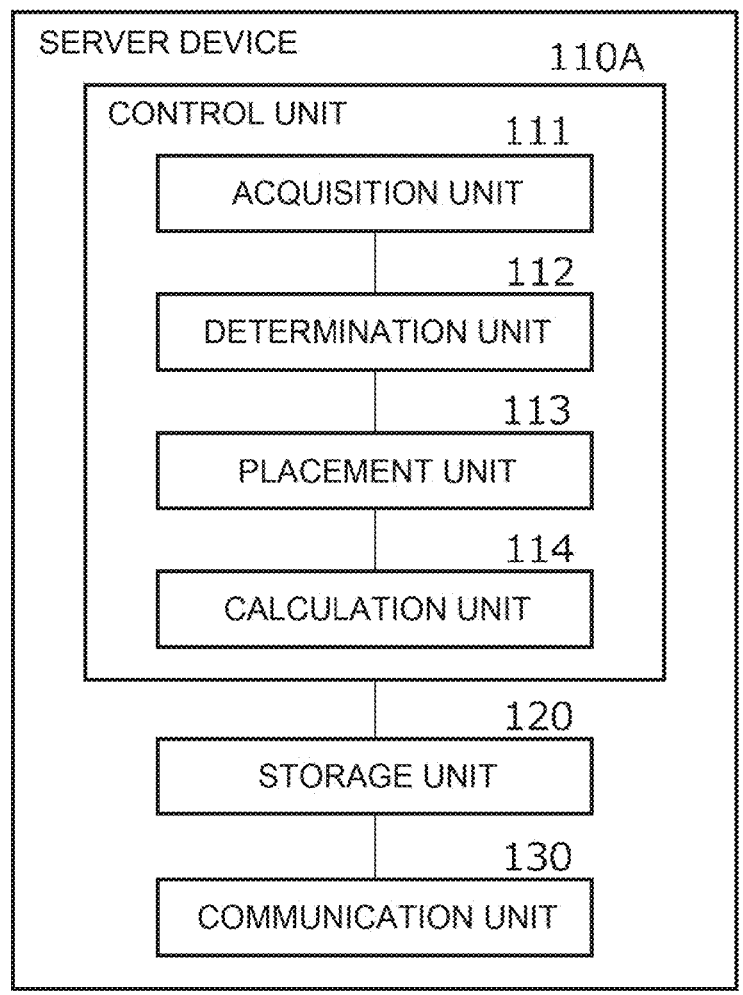
FIG. 5 is a diagram for explaining components of the server device according to the second embodiment.

FIG. 5 is a diagram for explaining components of the server-device 100A according to the second embodiment. Descriptions of components common to those of the first embodiment are omitted. The server device 100A includes a control unit 110A, a storage unit 120, and a communication unit 130. The control unit 110A includes a calculation unit 114 in addition to the acquisition unit 111, the determination unit 112, and the placement unit 113.

The calculation unit 114 calculates a second constraint condition that is a constraint condition at a second time that is a specific time in the future. Then, the calculation unit 114 predicts a future placement that is a placement of the first data in a case where the second constraint condition is followed. Then, when the amount of change in the data placement in the case where the placement of the data is changed from the placement of the current first data to the placement of the data at the second time is larger than the predetermined amount, the calculation unit 114 moves the first data already placed in one of the plurality of storage devices to the other storage device in advance within the range of the current constraint condition. That is, the calculation unit 114 changes the data placement at the present time in advance so that the amount of change in the data placement at the future time does not become larger than the predetermined amount. At this time, it is assumed that the calculation unit 114 decides to change the data placement according to the current constraint condition.

Operation of the Server Device

Figure 6:
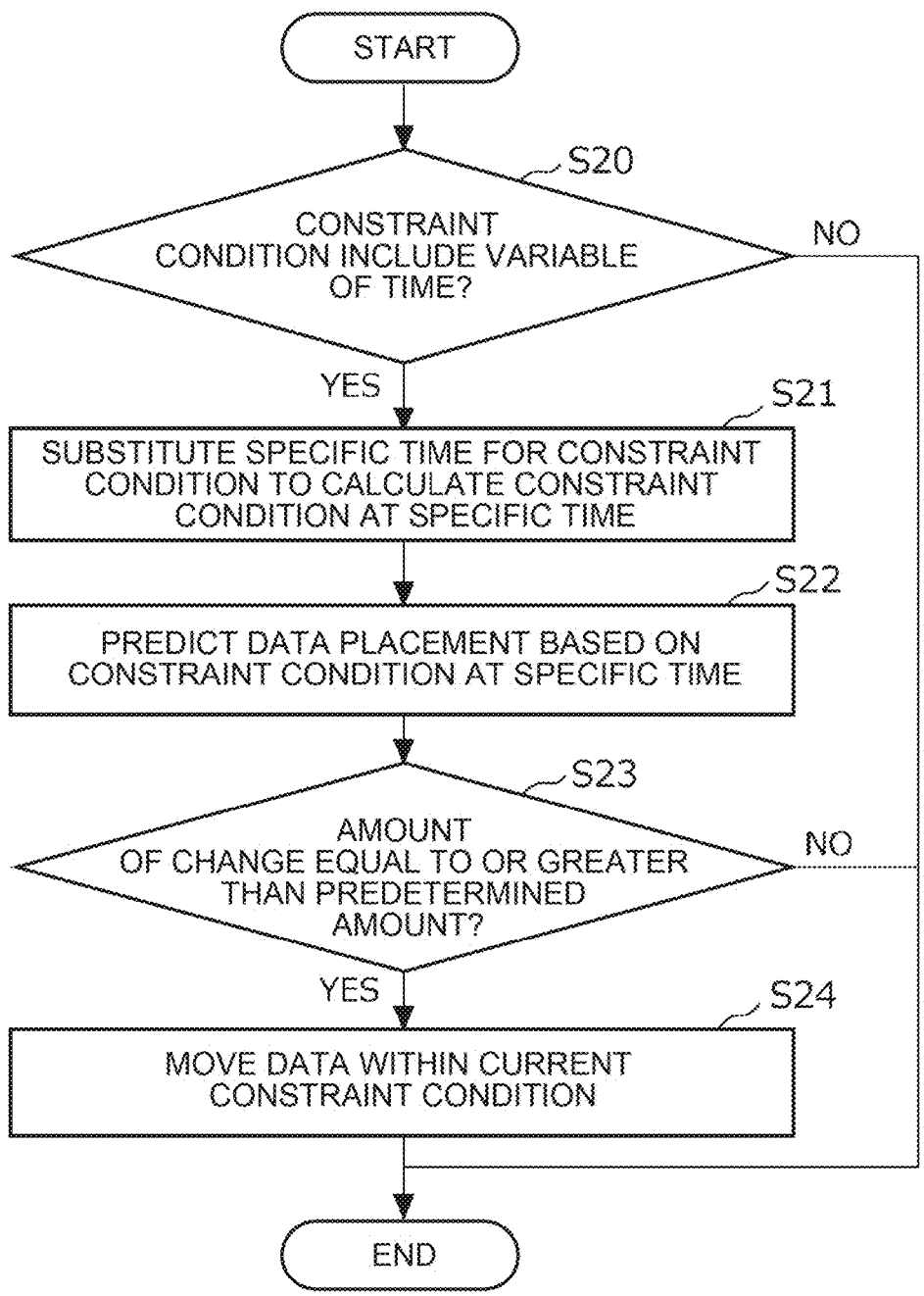
FIG. 6 is a flowchart of processing executed by a control unit of the server device according to the second embodiment.

Next, a process executed by the control unit 110A according to the second embodiment will be described. FIG. 6 is a flow chart of a process executed by the control unit 110A of the server device 100 according to the second embodiment. The processing of FIG. 6 is executed at an arbitrary timing after the processing of FIG. 3 is performed and the first data is placed in the plurality of storage devices.

First, in S20, the calculation unit 114 determines whether the constraint condition acquired by the acquisition unit 111 includes a time variable. That is, the calculation unit 114 determines whether or not the constraint condition is a constraint condition including a value changed according to the time to be substituted. In this step, when the calculation unit 114 determines that the constraint condition acquired by the acquisition unit 111 includes a variable of time, an affirmative determination is made.

If an affirmative determination is made in this step, the process proceeds to S21.

If a negative determination is made in this step, the process ends.

When the process transitions to S21, the calculation unit 114 substitutes the specific time into the constraint condition and calculates the constraint condition at the specific time. Here, the specific time may be a second time, which is a future time. As determined in S20, the constraint condition includes a value changed by the time, and thus the calculation unit 114 calculates the constraint condition at a specific time.

Next, in S22, the calculation unit 114 predicts the data placement based on the constraint condition at the specific time calculated by S21. For example, the calculation unit 114 predicts the data placement that will be realized under the constraint condition required at the second time.

Next, the calculation unit 114 determines whether the amount of change in the data when changing the data placement from the present data placement to the data placement based on the constraint condition at the specific time predicted by S22 is equal to or greater than a predetermined amount. The amount of data change means the total amount of data whose placement changes. That is, the amount of data change can be referred to as the amount of data transfer when the data placement is changed. That is, the calculation unit 114 determines whether or not the transfer amount of data necessary for changing the data placement from the current data placement to the data placement based on the constraint condition at a specific time is larger than a predetermined amount. In this step, when the calculation unit 114 determines that the transfer amount of data required for changing the data placement from the present data placement to the data placement based on the constraint condition at the specific time predicted by S22 is equal to or greater than a predetermined amount, an affirmative determination is made.

If an affirmative determination is made in this step, the process proceeds to S24.

If a negative determination is made in this step, the process ends.

When the process transitions to S24, the calculation unit 114 moves at least a part of the first data to the predicted data placement within the range of the current constraint condition. That is, the calculation unit 114 moves a part of the first data placed in one or more storage devices based on the current constraint condition to another storage device in advance within a range that does not deviate from the current constraint condition.

In the second embodiment, the calculation unit 114 predicts the future placement and moves the first data in advance, but the calculation unit 114 may execute other processing based on the prediction result. In addition, the calculation unit 114 may calculate the data placement at a specific time, not limited to the future time. The calculation unit 114 may calculate the constraint condition at the first time, which is a specific time, as the first constraint condition, and calculate the data placement based on the first constraint condition.

As described above, in the second embodiment, the server device 100 predicts the data placement required at a future time. The server device 100 changes the data placement in advance within a range satisfying the current constraint condition so that the amount of data movement when changing the current data placement to the future data placement is reduced. As a result, it is possible to reduce the movement of data to be performed between the plurality of storage devices as much as possible at the time when the future time arrives. Therefore, the server device 100 can suppress a decrease in computation efficiency due to replacement of data.

Other Embodiments

The above-described embodiment is merely an example, and the present disclosure may be appropriately modified and implemented without departing from the scope thereof.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. Non-transitory computer-readable storage media include, for example, magnetic disks (floppy disks, hard disk drives (HDD), etc.). Non-transitory computer-readable storage media include, for example, any type of disk, such as an optical disk (CD-ROM, DVD disk, Blu-ray disk, etc.), read only memory (ROM), random access memory (RAM). Non-transitory computer-readable storage media include, for example, EPROM, EEPROM, magnetic cards, flash memory, optical cards, any type of media suitable for storing electronic instructions.

What is claimed is:

1. An information processing device that places received first data in at least one of a plurality of storage devices, the information processing device comprising a control unit configured to
    acquire a constraint condition including a first condition regarding a time, the constraint condition being a condition for determining the storage device in which the first data is to be placed, and
    when a generation time of the first data meets the first condition, determine a first storage device according to the constraint condition, the first storage device being the storage device in which the first data is to be placed.

2. The information processing device according to claim 1, wherein the control unit is configured to, when the constraint condition includes a time variable,
    calculate a first constraint condition, the first constraint condition being the constraint condition at a first time that is a specific time, and
    predict data placement based on the first constraint condition.

3. The information processing device according to claim 1, wherein the control unit is configured to, when the constraint condition includes a time variable,
    calculate a second constraint condition, the second constraint condition being the constraint condition at a second time that is a future specific time,
    predict future placement that is placement of the first data according to the second constraint condition, and
    when an amount of change in data placement that is going to be caused by changing data placement from current placement of the first data to the future placement is larger than a predetermined amount at a time when the second time comes, move the first data that has already been placed in one of the storage devices to another one of the storage devices in advance at a current point in time within a range of the current constraint condition.

4. The information processing device according to claim 1, wherein the control unit is further configured to, when the constraint condition includes a condition regarding remaining capacities of the storage devices, determine, based on the remaining capacities of the storage devices, in which of the storage devices second data is to be placed, the second data being a duplicate of the first data.

5. The information processing device according to claim 4, wherein the control unit is configured to, when determining in which of the storage devices the second data that is the duplicate of the first data is to be placed, specify a predetermined range of the number of the storage devices in which the second data is to be placed, the predetermined range being from a first number of the storage devices to a second number of the storage devices, and determine to place the second data in the storage devices whose remaining capacity is a predetermined capacity or more out of the storage devices in such a manner that the specified predetermined range is satisfied.

\* \* \* \* \*